United States Patent
Kreutzer et al.

(10) Patent No.: US 9,347,536 B2
(45) Date of Patent: May 24, 2016

(54) SPINDLE NUT FOR A BALL SCREW

(71) Applicant: Schaeffler Technologies AG & Co. KG, Herzogenaurach (DE)

(72) Inventors: Mario Kreutzer, Sonneberg (DE); Gerd Sanewski, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 60 days.

(21) Appl. No.: 13/862,826

(22) Filed: Apr. 15, 2013

(65) Prior Publication Data

US 2013/0298710 A1 Nov. 14, 2013

(51) Int. Cl.
*F16H 25/22* (2006.01)

(52) U.S. Cl.
CPC ....... *F16H 25/2214* (2013.01); *Y10T 74/19767* (2015.01)

(58) Field of Classification Search
CPC .............. F16H 25/2214; B60T 13/745; Y10T 74/19767; Y10T 74/19772; Y10T 74/19749; Y10T 74/19777
USPC ........................... 188/72.8; 74/424.86, 424.87
See application file for complete search history.

(56) References Cited

U.S. PATENT DOCUMENTS

| | | | | |
|---|---|---|---|---|
| 2,636,397 A * | 4/1953 | Jacubenta | ................... | 74/424.87 |
| 2,836,075 A * | 5/1958 | Galonska | ................... | 74/424.87 |
| 3,399,581 A * | 9/1968 | Valenti et al. | .............. | 74/424.86 |
| 3,850,046 A * | 11/1974 | Nilsson | ....................... | 74/424.87 |
| 3,971,264 A | 7/1976 | Detraz et al. | | |
| 4,604,911 A * | 8/1986 | Teramachi | .................. | 74/424.87 |
| 5,107,967 A * | 4/1992 | Fujita et al. | ................... | 188/72.1 |
| 5,373,755 A * | 12/1994 | Rohlinger | .................. | 74/424.86 |
| 6,089,117 A * | 7/2000 | Ebina et al. | ................ | 74/424.87 |
| 7,205,688 B2 * | 4/2007 | Otaki et al. | ................ | 310/67 R |
| 2005/0016308 A1 * | 1/2005 | Hayashi | ..................... | 74/424.86 |
| 2010/0242469 A1 * | 9/2010 | Jungbecker et al. | ............ | 60/594 |

FOREIGN PATENT DOCUMENTS

| | | |
|---|---|---|
| DE | 2423299 B | 9/1977 |
| EP | 1134455 | 9/2001 |

* cited by examiner

*Primary Examiner* — Xuan Lan Nguyen
(74) *Attorney, Agent, or Firm* — Volpe and Koenig, P.C.

(57) ABSTRACT

A spindle nut for a ball screw with a nut part on whose inner periphery there is a spiral ball groove that winds around a spindle axis for the rolling of balls and with two deflection elements, the balls are deflectable into the curved deflection channel of each deflection element and the nut part has two recesses that are spaced apart from each other in the axial direction and one of the deflection elements is arranged in each recess. The nut part is provided with a straight return channel for the balls, and the straight return channel is connected to the two deflection channels. The balls are movable along a ball track in the curved deflection channel and in the straight return channel, and the straight return channel is arranged within a wall thickness of the spindle nut and is arranged at an angle relative to the spindle axis.

7 Claims, 4 Drawing Sheets

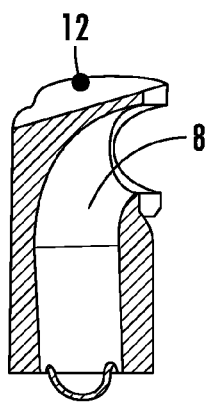
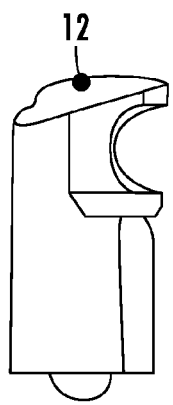
FIG. 7  FIG. 8
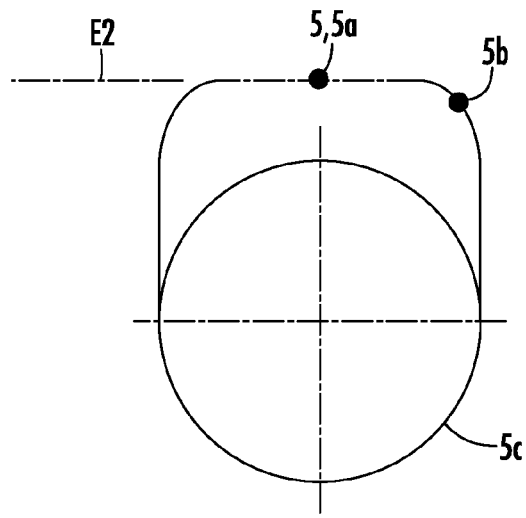
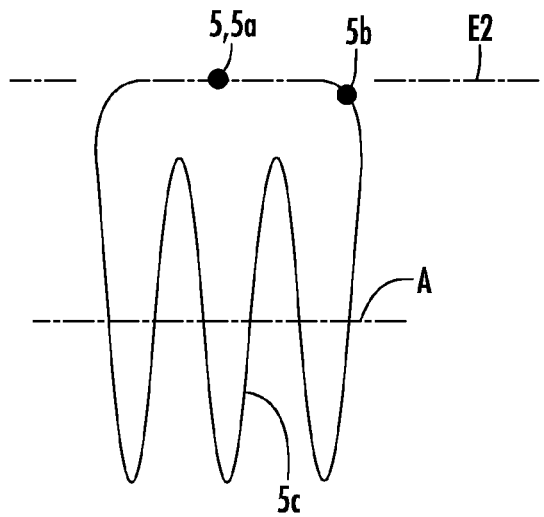
FIG. 9  FIG. 10
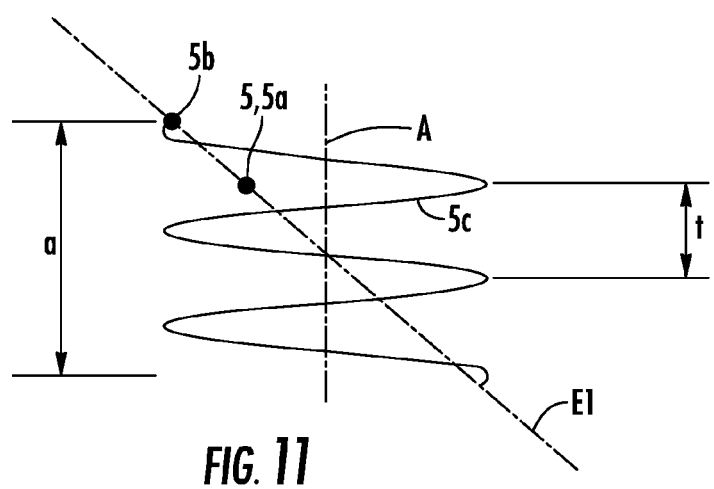
FIG. 11

SPINDLE NUT FOR A BALL SCREW

INCORPORATION BY REFERENCE

The following documents are incorporated herein by reference as if fully set forth: German Patent Application No. DE102012009613.5, filed May 10, 2012; and German Patent Application No. DE102012213856.0, filed Aug. 6, 2012.

BACKGROUND

The present invention relates to a spindle nut for a ball screw and also to a ball screw with a spindle nut arranged on a threaded spindle, and also to an electromechanical brake booster provided with a ball screw for the operating brake of a motor vehicle. A ball screw has a threaded spindle and a spindle nut arranged on the threaded spindle, wherein balls are arranged between the threaded spindle and the spindle nut. A relative rotational movement between the spindle nut and the threaded spindle is converted into a translational movement between the spindle nut and the threaded spindle.

From EP1134455A1, for example, a ball screw was known, whose spindle nut has a nut part on whose inner periphery a spiral ball groove wound about a spindle axis is formed for the rolling of the balls. This spindle nut is provided with deflection elements for deflecting the balls, wherein the nut part has two recesses that are arranged spaced axially apart from each other and in each of which there is one of the deflection elements. The nut part is provided with a straight return channel formed as a return bore for the balls, wherein the straight return channel connects the two recesses to each other and wherein the straight return channel is arranged within the wall thickness of the spindle nut. The balls roll along a ball track that is formed by the return channel and the deflection elements. The straight return channel is arranged axis-parallel to the spindle axis. Due to the geometric position of the straight return channel and the curved deflection channel, the balls are subject to considerable acceleration when they enter into the curved deflection channel, wherein this acceleration can cause undesired friction losses in the contact of the balls with each other, which can result in the balls stalling in the ball channel and thus a fluctuation in the efficiency.

The recesses in the nut part each comprise two surfaces running essentially orthogonal to the longitudinal axis of the threaded spindle and also two concave surfaces essentially parallel to the longitudinal axis of the threaded spindle. These orthogonal surfaces reach up to the inner periphery of the nut part. The bearing capacity of the ball groove formed on the inner periphery of the nut part is lessened in the area of the return channel in any case in an edge area between the inner peripheral surface of the nut part and the orthogonal surface of the recess.

SUMMARY

The objective of the present invention is to provide a spindle nut that is improved using one or more features according to the invention. Here, the return channel is arranged at an angle to the spindle axis, and this arrangement produces several advantages that are explained below.

With the arrangement of the return channel according to the invention, the ball grooves on the nut part are weakened only in an axially middle section of the nut part. The axial ends of the return channel can be arranged based on the arrangement according to the invention with a radially enlarged distance to the inner periphery of the nut part. Due to this enlarged radial distance to the inner periphery of the nut part, it is also possible to select larger deflection radii, so that the balls are subject to smaller friction losses when entering the deflection channel and can circulate without stalling. The angle of inclination of the return channel relative to the spindle axis must be selected so that, together with the deflection elements, a so-called tangential ball channel is formed. This means that the deflection channel can connect tangentially to the straight return channel and can also connect tangentially to a load channel that is defined by the ball groove formed on the inner periphery of the spindle nut. Consequently there is no kink in the ball track.

Advantageously, this ball track arranged in the return channel and in the deflection channel lies in a common plane that intersects the spindle axis. The balls are deflected in this common plane, so that changes to the direction of motion of the balls are reduced to a minimum.

In this configuration, the straight return channel can be arranged in a plane that is arranged at a parallel distance to the spindle axis. In this way, a symmetric arrangement of the ends of the return bore can be formed with reference to the inner periphery of the nut part, wherein both ends of the return bore have an equal-sized radial distance to the inner periphery of the nut part.

The recesses for the deflection elements penetrate the wall thickness of the nut part. These recesses can be, for example, drilled or stamped. The deflection elements can be inserted into these recesses in a simple way from the outside and fixed in the recesses, for example, by a captive securing device. It is conceivable, for example, to produce the deflection elements from plastic in an injection molding process. In this case, a captive securing device can be provided in that knobs molded integrally on the periphery of the deflection elements engage in depressions that are provided on the nut part in the walls of the recess.

In configurations according to the invention, the return channel is advantageously formed as a return bore that penetrates, starting from one end face of the nut part, the one recess provided for holding the deflection element and is formed up to the other recess. In this way, the return channel can be produced with one drill by drilling the return bore from one end face.

A ball screw provided with a spindle nut according to the invention has an endless ball channel in which the balls circulate endlessly, wherein the endless ball channel has a spiral load channel wound by more than one winding about the spindle axis and also the return channel and the deflection channels that endlessly connect the load channel to the return channel. The load channel is formed by the ball groove of the spindle nut and also by a spiral ball groove wound about the spindle axis for the threaded spindle. With the return channel arranged at an angle to the spindle axis, this ball screw according to the invention allows the formation of the already mentioned tangential ball channel, wherein the balls are arranged in the endless ball channel along the ball track that can be divided into three sections: a curved ball track section in the deflection channel, a straight ball track section in the return channel, and also a spiral ball track section in the load channel. The balls move along this endless ball track, wherein this endless ball track is formed without kinks in the transitions from the deflection channel to the load channel on one hand and to the return channel on the other hand. Through the inclined arrangement of the return channel relative to the spindle axis, large deflection radii are made possible that prevent the balls from blocking themselves in the deflection channel. The radius of curvature of the deflection channel should be larger than the ball diameter, to prevent this selfblocking. In the ball screw according to the invention, the curved ball track sections can connect tangentially to the spiral ball track section and also tangentially to the straight ball track section of the return channel with the return channel arranged at an angle to the spindle axis.

In one preferred construction of a ball screw according to the invention, the axial distance a between the ends facing away from the return channel in the curved ball track sections—that is, where the tangential transition to the load channel is located—is given by the equation $a=n*t+t/2$, where n is a natural number and t is the pitch of the spiral wound ball groove of the threaded spindle indicated in a unit of length. In this variant according to the invention, these ends of the curved ball track sections lie diagonally opposite at the same distance to an intersecting point that is given by the intersection of a plane containing the ball track section of the return channel with the spindle axis. In this way, the balls are deflected at both ends of the return channel in the same way. In this arrangement, in connection with the return channel arranged at an angle to the longitudinal axis of the threaded spindle, a deflection of the balls in the deflection channel is given that can have a maximum radius of curvature for the given geometry of the spindle diameter of the spindle nut diameter. In this way, the balls can be returned after, for example, 1.5 windings or 2.5 windings or also 3.5 windings. Consequently, in this arrangement, the beginning and end of the load channel lie at opposite peripheral sides of the threaded spindle.

The spindle nut according to the invention is advantageous for all applications of ball screws in which the spindle nut is driven to rotate. This is because, due to the return channel placed in the wall thickness of the nut part and the deflection elements advantageously arranged within the outer periphery of the nut part, for example, a driving disk can be placed locked in rotation on the outer periphery of the spindle nut. For example, a belt pulley or a ring gear can be arranged on the outer periphery of the spindle nut in an interference fit, wherein the full extent of the spindle nut is available for an interference fit due to the return channel placed within the wall thickness of the nut part.

Therefore, because the return bore can be drilled from an end face of the spindle nut, the opposite end face of the spindle nut can be formed as a raceway for an axial bearing, without undesired breaks in the raceway being required here. Advantageously, the raceway is formed as a flat surface for a needle bearing or as a ball groove for an axial groove ball bearing.

In electromechanical brake boosters for the operating brake of a motor vehicle, a ball screw according to the invention can be used advantageously. The spindle nut can be mounted axially on a housing of the brake booster and also driven to rotate, wherein the threaded spindle is arranged locked in rotation and moveable axially relative to the spindle nut, wherein the threaded spindle actuates a piston of a main brake cylinder and wherein a bearing surface of an axial bearing is formed on an end face of the nut part of the spindle nut, wherein the spindle nut is mounted axially on the housing by the axial bearing. Axial forces acting on the threaded spindle can be introduced via the axial bearing from the spindle nut into the housing.

In this electromechanical brake booster, for the rotational driving of the spindle nut, for example, a belt pulley or a gear could be pressed onto the outer periphery of the spindle nut, so that torques can be easily transmitted. In ball screws according to the invention, the spindle nut could also be driven directly by the motor without intermediate gear stages, wherein the spindle nut can be connected locked in rotation with the rotor of the motor. On the one end face of the spindle nut, the end face formed by the nut part is provided as a raceway for the axial bearing.

BRIEF DESCRIPTION OF THE DRAWINGS

The invention is described in more detail below with reference to an embodiment shown in a total of 12 figures. Shown are:

FIG. 7 is a section view through a deflection element of the spindle nut according to the invention, FIG. 8 is a view of the deflection element from FIG. 7, FIG. 9 is a view of an endless ball track of the balls in the ball screw according to the invention, viewed along the spindle axis, FIG. 10 is a side view of the ball track, FIG. 11 is a top view of the ball track.

DETAILED DESCRIPTION OF THE PREFERRED EMBODIMENTS

Figure 1:
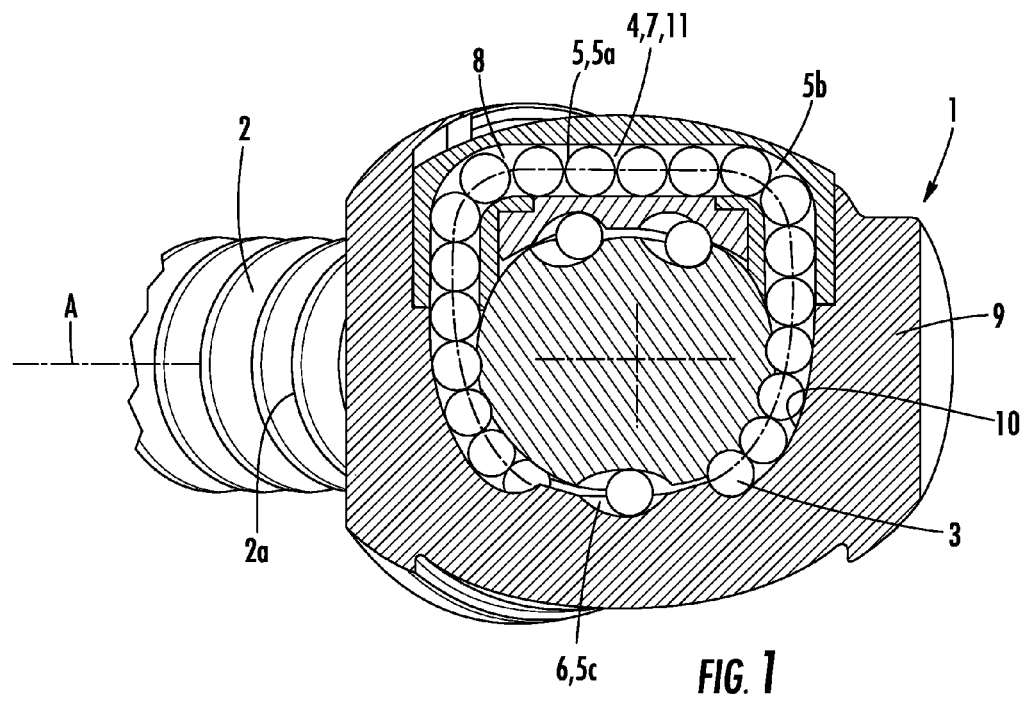
FIG. 1 is a cross sectional view through a ball screw according to the invention.

FIG. 1 shows a ball screw according to the invention in a perspective view with a sectioned spindle nut 1. The spindle nut 1 is arranged on a threaded spindle 2 so that it can rotate about a spindle axis A. Between the spindle nut 1 and the threaded spindle 2 there are balls 3 that circulate endlessly in an endless ball channel 4 formed by the threaded spindle 2 and the spindle nut 1. The balls 3 are arranged in the endless ball channel 4 along an endless ball track 5. The ball track 5 intersects the ball centers of the balls 3.

The endless ball channel 4 has a spiral load channel 6 that winds with more than one winding about the spindle axis A and also a straight return channel 7 and two deflection channels 8 that connect the spiral load channel 6 endlessly to the straight return channel 7.

The endless ball track 5 can be divided into three sections: one straight ball track section 5a in the return channel 7, two curved ball track sections 5b in the deflection channels 8, and one spiral ball track section 5c in the load channel 6.

The spindle nut 1 has an approximately tubular nut part 9 on whose inner periphery a spiral ball groove 10 wound about the spindle axis A is formed for the balls 3. The nut part 9 also has the return channel 7 that is constructed as a return bore 10. The spindle nut 1 also has two deflection elements 12 on each of which one of the deflection channels 8 is formed. These deflection elements 12 are produced from plastic in an injection molding process, wherein each deflection element 12 can be constructed in one part or in multiple parts.

The threaded spindle 2 has a spiral ball groove 2a that is wound about the spindle axis and forms, together with the ball groove 10 of the spindle nut 1, the load channel 6.

Figure 2:
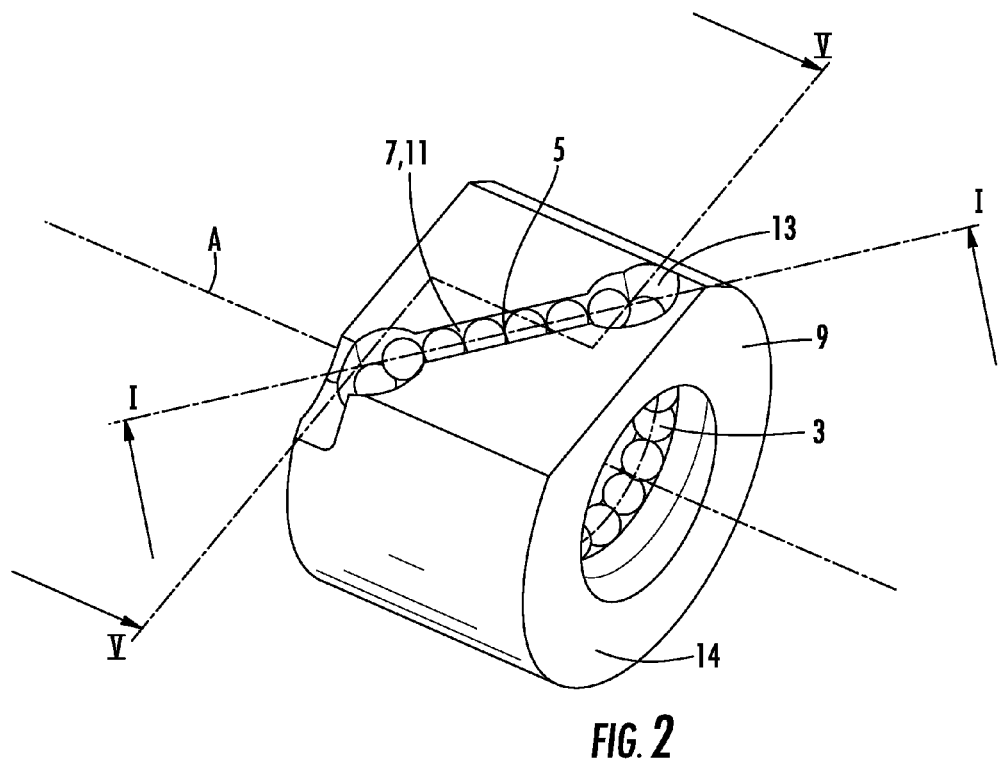
FIG. 2 is a partial section view of the spindle nut according to the invention for the ball screw from FIG. 1.

FIG. 2 shows the partially sectioned nut part 9 of the spindle nut 1 with the balls 3 arranged along the ball track 5. FIG. 2 clearly shows that the return channel 7 is arranged at an angle to the spindle axis A. At the two axial ends of the nut part 9 there is a recess 13 in the nut 9, wherein this recess penetrates the wall thickness of the nut. The deflection elements 12 not shown here are arranged in these recesses 13.

The return bore 11 is drilled from the end face on the left in FIG. 2 into the nut part 9. The return bore 11 penetrates the first recess 13 and opens into the other recess 13. The return bore 11 consequently connects the two recesses 13 to each other.

The nut part 9 has, on its front end face in FIG. 2, a circular ring surface that is formed as a raceway 14 of an axial bearing.

From FIGS. 1 and 2 it can be seen that the return channel 7 is connected on its two ends to the two deflection channels 8 of the deflection elements 12, so that the balls 3 can circulate along their endless ball track 5. From FIG. 1 it can also be seen that the return channel 7 is arranged parallel to a plane containing the spindle axis A.

FIG. 2 shows the sectional profile through the nut part 9 as shown in FIG. 1. This sectional profile lies in a plane E in which both the straight ball track section 5a and also the curved ball track sections 5b are arranged. This plane E intersects the spindle axis A. With this position of the return bore 11 in the nut part 9 it is achieved that the ends of the return bore 11—that is, where they connect the recesses 13—have the greatest radial distance to the inner periphery of the nut part 9. Thus, sufficient space is provided for a large deflection radius of the curved ball track section 5b.

Figure 3:
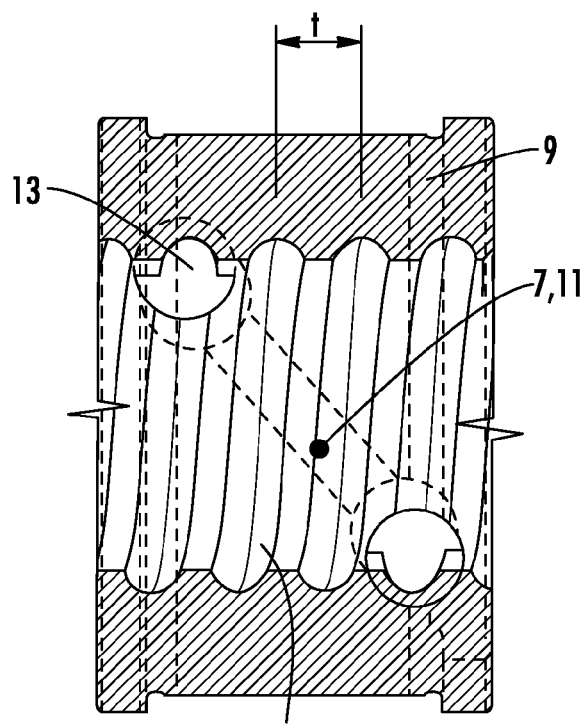
FIG. 3 is a longitudinal section view through the spindle nut according to the invention.

FIG. 3 shows a longitudinal section through the nut part 9, wherein the recesses 13 and the ball groove 10 are shown clearly. The return bore 11 is shown with dashed lines. The thread pitch t of the spiral ball groove 10 wound about the spindle axis A is also shown.

Figure 4:
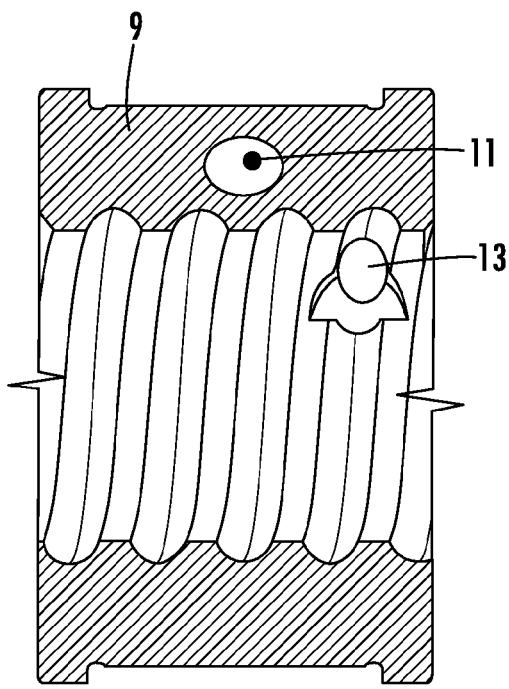
FIG. 4 is another longitudinal section view through the spindle nut according to the invention.

FIG. 4 shows another longitudinal section through the nut part 9, wherein the sectioned return bore 11 can be seen clearly.

Figure 5:
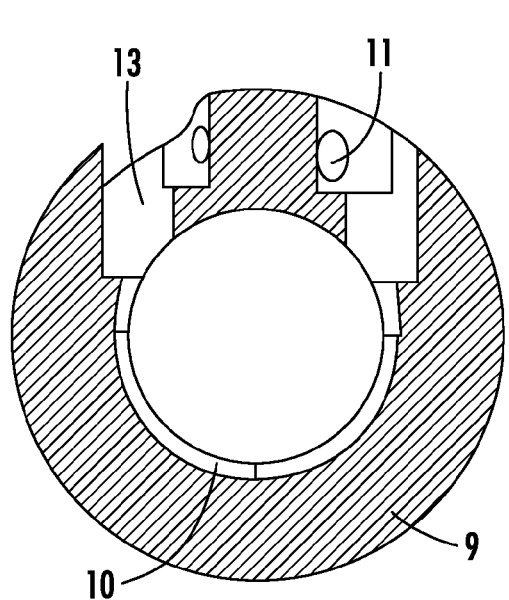
FIG. 5 is a cross sectional view through the spindle nut according to the invention along the section line V-V in FIG. 2.

FIG. 5 shows a cross section through the nut part 9, wherein the two recesses 13 and the return bore 11 opening into the recesses 13 are shown clearly.

Figure 6:
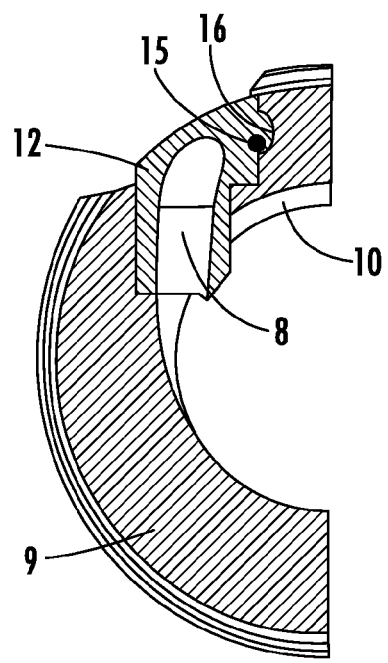
FIG. 6 is another cross sectional view through the spindle nut according to the invention with inserted deflection element.

FIG. 6 shows a partial cross section through the nut part 9 with the inserted deflection element 12. The deflection channel 8 formed on the deflection element 12 is shown clearly. It can be further seen from FIG. 6 that a knob 15 formed integrally on the deflection element 12 engages in a depression 16 of the nut part 9, so that an easy captive securing and fixing of the deflection element 12 is guaranteed in the nut part 9. The deflection element 12 can be inserted into the recess from the outside, wherein the deflection element 12 engages in the depression 16 with elastic compression. This depression 16 is provided in the walls of the recess 13.

FIGS. 7 and 8 show the deflection element 12 as an individual part, wherein FIG. 7 shows the deflection element 12 in section and FIG. 8 shows a view of the deflection element 12.

FIGS. 9, 10, and 11 show the endless ball track 5 of the ball screw described above, along which the balls 3 circulate in the endless ball channel 5. The individual ball track sections of the endless ball channel 5 are clearly shown, namely the straight ball track section 5a of the return channel, the two curved ball track sections 5b of the two deflection channels 8, and the spiral ball track section 5c of the load channel 6. The load channel 6 winds over 2.5 windings about the spindle axis A.

From FIG. 10 it can be seen, in particular, that the straight ball track section 5a is arranged parallel to the spindle axis A, wherein this straight ball track section 5a lies in FIG. 10 in an axis that intersects the plane of the paper. FIGS. 9 and 10 show a plane E2 in which the straight ball track section 5a lies, wherein this plane E2 can be arranged in FIGS. 9 and 10 perpendicular to the plane of the paper.

From FIG. 11 it can be seen that the straight ball track section 5a is arranged at an angle to the spindle axis A. The straight ball track section 5a and the adjacent bent ball track sections 5b lie in a common plane E1 that is arranged perpendicular to the plane of the paper in the view in FIG. 11.

In the ball screw according to the invention, the balls 3 are subject to only two changes in direction along their endless ball track 5, namely when they enter and exit the return channel 7, so that friction losses of the balls 3 with each other are reduced. Through the position of the return channel 7 provided according to the invention in the nut part 9, its axial ends are arranged with the greatest possible radial distance to the inner periphery of the nut part 9.

FIG. 11 shows schematically a distance a that is given by the axial distance of the ends facing away from the straight ball track section 5a for the two curved ball track sections 5b. In this ball screw according to the invention, this axial distance a is given by a=n*t+t/2, where n is a natural number and t is the pitch of the spiral wound ball grooves.

From FIG. 4 it can be seen, in particular, that the nut part 9 is formed with its outer periphery as an interference fit for a not-shown drive element for a rotary drive of the spindle nut.

The deflection elements 12 can also be fixed on the nut part 9 such that, for example, a not-shown tolerance ring is arranged on the nut part 9.

Due to the return bore 11 arranged within the wall thickness of the nut part 9, the outer diameter of the nut part 9 can be used for transferring torque over the entire length of the return channel 7.

Figure 12:
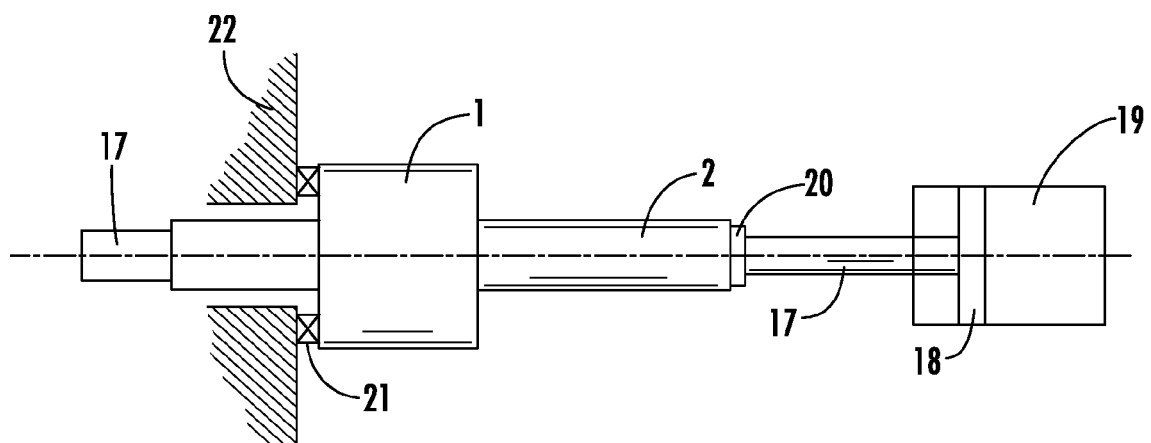
FIG. 12 is a schematic diagram of an electromechanical brake booster for the operating brake of a motor vehicle with a ball screw according to the invention.

FIG. 12 shows in a schematic view an electromechanical brake booster for the operating brake of a motor vehicle with a ball screw according to the invention as it was previously described. The threaded spindle 2 is here constructed as a hollow shaft, wherein a piston rod 17 is guided through the hollow threaded spindle 2 and actuates a piston 18 of a main brake cylinder 19. An axial stop 20 for the hollow threaded spindle 2 is arranged on the piston rod 17.

The spindle nut 1 is mounted axially on a housing 22 on its axial side facing away from the main brake cylinder 19 by means of an axial bearing 21.

When the spindle nut 1 is set in rotation by a not-shown drive wheel, this rotation advances the hollow threaded spindle 2, which carries along the piston rod 17 by means of the axial stop 20, so that the piston 18 is displaced in the main brake cylinder 19, wherein the compression space 23 of the main brake cylinder 19 is reduced and hydraulic pressure is built up.

If the brake booster fails, the piston rod 17 can be actuated by means of the actuation of the brake pedal, independent from the hollow threaded spindle 2, wherein the axial stop 20 is then lifted from the hollow threaded spindle 2.

LIST OF REFERENCE NUMBERS

1 Spindle nut
2 Threaded spindle
3 Ball
4 Endless ball channel
5 Endless ball track
5a Straight ball track section 5b Curved ball track section
5c Spiral ball track section
6 Load channel
7 Return channel
8 Deflection channel
9 Nut part
10 Ball groove
11 Return bore
12 Deflection element
13 Recess
14 Raceway
15 Knob
16 Depression
17 Piston rod
18 Piston
19 Main brake cylinder
20 Axial stop
21 Axial bearing
22 Housing
23 Compression space

The invention claimed is:

1. A spindle nut for a ball screw, comprising a nut part having an inner periphery with a spiral ball groove that is wound around a spindle axis A, balls being rollable in the spiral ball groove, two deflection elements, with one located at each end of the spiral ball groove, wherein the balls are deflected into a curved deflection channel of each of the deflection elements, the nut part has two recesses that are spaced apart from each other in an axial direction and one of the deflection elements is arranged in each of the recesses, the nut part is provided with a straight return channel for the balls, the straight return channel is arranged at an angle relative to the spindle axis A and is connected to the two deflection channels of the deflection elements, the balls are movable along a ball track in the curved deflection channel and in the straight return channel, and the straight return channel is arranged within a wall thickness of the spindle nut with a whole circumference of the straight return channel formed by material of the spindle nut, wherein the return channel is constructed as a return bore that penetrates one of the recesses starting from only one axial end face of the nut part and extends to the other one of the recesses.

2. The spindle nut according to claim 1, wherein the ball track arranged in the deflection channel and in the straight return channel is arranged in a common plane E1 intersecting the spindle axis A.

3. The spindle nut according to claim 1, wherein the straight return channel is arranged in a plane E2 that is arranged at a parallel distance to the spindle axis A.

4. A ball screw comprising the spindle nut according to claim 1, and a threaded spindle on which the spindle nut is arranged, with an endless ball channel that is formed by the threaded spindle and the spindle nut and in which the balls arranged along an endless ball track circulate endlessly, the endless ball channel has a spiral load channel wound about the spindle axis A over more than one winding and also has the return channel and the deflection channels that connect the load channel to the return channel endlessly, and the load channel is formed by the ball groove of the spindle nut and also by a spiral ball groove of the threaded spindle wound about the spindle axis A.

5. The ball screw according to claim 4, wherein the curved deflection channels each have a curved ball track section of the endless ball track, an axial distance a between ends of the curved ball track sections facing away from the return channel on the two deflection elements is given by $a=n*t+t/2$, where n is a natural number and where t is a pitch of the spiral ball groove of the threaded spindle specified as a measure of length.

6. The ball screw according to claim 5, wherein the curved ball track sections of the deflection channels connect tangentially to a spiral ball track section of the load channel and also to a straight ball track section of the return channel.

7. An electromechanical brake booster for an operating brake of a motor vehicle comprising the ball screw according to claim 4, in which the spindle nut is mounted axially on a housing and is driven to rotate, and the threaded spindle is locked in rotation but moveable axially relative to the spindle nut, the threaded spindle actuates a piston of a main brake cylinder, a bearing surface of an axial bearing is constructed on an end surface of the nut part of the spindle nut, and the spindle nut is mounted axially on the housing by the axial bearing.

* * * * *